US011015915B2

(12) United States Patent
Tokida (10) Patent No.: US 11,015,915 B2
(45) Date of Patent: May 25, 2021

(54) ADHESIVE INSPECTION DEVICE AND ADHESIVE INSPECTION METHOD

(71) Applicant: SANYO MACHINE WORKS, LTD., Aichi (JP)

(72) Inventor: Katsuo Tokida, Aichi (JP)

(73) Assignee: SANYO MACHINE WORKS, LTD., Aichi (JP)

( * ) Notice: Subject to any disclaimer, the term of this patent is extended or adjusted under 35 U.S.C. 154(b) by 315 days.

(21) Appl. No.: 16/304,851

(22) PCT Filed: Jun. 20, 2016

(86) PCT No.: PCT/JP2016/068209
§ 371 (c)(1),
(2) Date: Nov. 27, 2018

(87) PCT Pub. No.: WO2017/221289
PCT Pub. Date: Dec. 28, 2017

(65) Prior Publication Data
US 2020/0326176 A1      Oct. 15, 2020

(51) Int. Cl.
*G01B 11/02*      (2006.01)
*G01B 11/28*      (2006.01)
*G01N 21/958*    (2006.01)

(52) U.S. Cl.
CPC .............. *G01B 11/02* (2013.01); *G01B 11/28* (2013.01); *G01N 21/958* (2013.01)

(58) Field of Classification Search
CPC ......... G01N 33/5005; G01N 33/57492; G01N 21/6456; G01N 2333/4703;
(Continued)

(56) References Cited

U.S. PATENT DOCUMENTS 5,807,606 A * 9/1998 Mould .................. H05K 3/305
                                                                   427/10
9,593,939 B1 * 3/2017 Xie ..................... G01B 11/0691
(Continued)

FOREIGN PATENT DOCUMENTS

CN          103345632         10/2013
CN          104197838         12/2014
(Continued)

OTHER PUBLICATIONS

International Search Report dated Sep. 6, 2016 in International (PCT) Application No. PCT/JP2016/068209.
(Continued)

*Primary Examiner* — Michael P Stafira
(74) *Attorney, Agent, or Firm* — Wendroth, Lind & Ponack, L.L.P.

(57) ABSTRACT

An adhesive inspection device inspects an application state of an adhesive that is linearly applied in a triangular cross-sectional shape onto a surface of fixed window glass for an automobile. The adhesive inspection device includes a laser irradiation unit configured to irradiate an adhesive with line laser light from above the adhesive so that a projection line extends over a surface of the adhesive to portions of the glass on both sides of the adhesive, an imaging unit configured to image, from above the adhesive, an imaging region that includes the projection line and is located on the periphery of the adhesive, and output imaging information, and a determination unit configured to determine, based on the imaging information, a shape surrounded by the projection line formed on the surface of the adhesive and a surface of the glass.

14 Claims, 4 Drawing Sheets

(58) Field of Classification Search
CPC .......... G01N 2800/52; G01N 33/5008; G01N 33/5044; G01N 33/5082; G01N 33/54353; G01N 33/54366; G01N 33/57484; G01N 33/57496; G01N 33/58; G01N 33/582; G01N 15/1459; G01N 1/30; G01N 2001/2826; G01N 2015/1006; G01N 2015/1493; G01N 2021/6419; G01N 2021/7723; G01N 2021/7759; G01N 2021/7786; G01N 21/278; G01N 21/64; G01N 21/6402; G01N 21/6428; G01N 21/643; G01N 21/6458; G01N 21/6489; G01N 21/65; G01N 21/658; G01N 21/77; G01N 2201/0221; G01N 2201/0227; G01N 2201/0245; G01N 2201/06113; G01N 2201/0633; G01N 2201/127; G01N 2291/2638; G01N 22/02; G01N 2333/165; G01N 2333/245; G01N 2333/52; G01N 2333/723; G01N 2333/91255; G01N 2440/14; G01N 2500/02; G01N 2500/12; G01N 2570/00; G01N 2800/042; G01N 2800/062; G01N 2800/2821; G01N 2800/7028; G01N 29/28; G01N 31/22; G01N 33/5011; G01N 33/5014; G01N 33/5041; G01N 33/5058; G01N 33/5073; G01N 33/5091; G01N 33/542; G01N 33/54306; G01N 33/54393; G01N 33/569; G01N 33/573; G01N 33/5735; G01N 33/57415; G01N 33/57423; G01N 33/5748; G01N 33/68; G01N 33/6845; G01N 33/6854; G01N 33/6896; G01N 80/33; G01N 33/84; G02B 2027/138; G02B 2027/0154; G02B 2027/0187; G02B 27/0172; G02B 1/043; G02B 2027/0127; G02B 2027/0141; G02B 2027/0163; G02B 2027/0183; G02B 21/002; G02B 21/06; G02B 21/082; G02B 21/16; G02B 21/367; G02B 2207/114; G02B 26/101; G02B 27/0093; G02B 27/01; G02B 27/0101; G02B 27/0149; G02B 27/017; G02B 27/0179; G02B 27/62; G02B 5/30; G02B 3/3016; G01B 11/14; G01B 11/25; G01J 3/0289; G01J 3/18; G01J 3/4406

See application file for complete search history.

(56) References Cited

U.S. PATENT DOCUMENTS

| | | | |
|---|---|---|---|
| 2005/0244569 A1* | 11/2005 | Estelle ................ | B05B 12/084 427/8 |
| 2006/0283978 A1 | 12/2006 | Yao | |
| 2008/0024602 A1* | 1/2008 | Linnenkohl .......... | G06T 7/0004 348/128 |
| 2010/0019785 A1* | 1/2010 | Wang .................. | G01N 27/048 324/696 |
| 2014/0097350 A1* | 4/2014 | Reichelsheimer .. | B32B 37/1284 250/372 |
| 2015/0104563 A1* | 4/2015 | Lowe .................. | G01N 25/72 427/8 |

FOREIGN PATENT DOCUMENTS

| | | | |
|---|---|---|---|
| DE | 102004021447 A1 * | 11/2005 | ......... G01B 11/0608 |
| JP | 2008-543541 | 12/2008 | |
| JP | 2011-185630 | 9/2011 | |
| JP | 2014-77726 | 5/2014 | |
| JP | 2015-095794 | 5/2015 | |
| JP | 2016-70810 | 5/2016 | |

OTHER PUBLICATIONS

International Preliminary Report on Patentability and Written Opinion of the International Searching Authority dated Dec. 25, 2018 in International (PCT) Application No. PCT/JP2016/068209.

Office Action dated Apr. 15, 2020 in corresponding Chinese Patent Application No. 201680084810.7 with English Translation of Search Report.

Office Action dated Nov. 16, 2020 in corresponding Chinese Patent Application No. 201680084810.7 with English-translation of Search Report.

Office Action dated Feb. 16, 2021 in corresponding Japanese Patent Application No. 2020-039992 with English translation.

* cited by examiner

ADHESIVE INSPECTION DEVICE AND ADHESIVE INSPECTION METHOD

TECHNICAL FIELD

The present invention relates to an improvement of a technology of inspecting an application state of an adhesive with respect to a workpiece that is an object to be bonded.

BACKGROUND ART

In general, fixed window glass, for example, a windshield or rear glass for an automobile, is bonded and fixed to a predetermined position of a vehicle body after an adhesive is linearly applied onto the periphery of the fixed window glass (see, for example, Patent Literature 1). The adhesive is applied onto the fixed window glass through use of, for example, a robot hand having an application device at a distal end thereof.

Further, as a cross-sectional shape of the adhesive to be linearly applied onto the fixed window glass, a substantially triangular shape may be recently adopted for the reason that the adhesive easily spreads uniformly at a time of bonding and the like. In this case, for example, a device having a nozzle, which is brought close to or brought into abutment against a region of the fixed window glass onto which the adhesive is to be applied, is used as the application device. The nozzle has a narrowing outlet port that is cut out into a substantially triangular shape backwardly in an application advancing direction, and the adhesive extruded from the narrowing outlet port is linearly applied onto the fixed window glass while exhibiting a substantially triangular cross-sectional shape in conformity with the shape of the narrowing outlet port (see, for example, Patent Literature 2).

CITATION LIST

Patent Literature 1: JP 2015-095794 A
Patent Literature 2: JP 2008-543541 A

SUMMARY OF INVENTION

Technical Problem

In the related art, the application state of the adhesive may be inspected by determining the total application amount of the adhesive applied onto the fixed window glass. In this case, for example, the supplied amount of the adhesive supplied from a supply pump provided to the application device is assumed as the total application amount of the adhesive applied onto the fixed window glass, to thereby determine the total application amount of the adhesive applied onto the fixed window glass.

However, when the application state of the adhesive is inspected based only on the total application amount thereof, even in the case where the application amount of the adhesive is excessive in some portions and insufficient in the other portions on the periphery of the fixed window glass, the total application amount may be determined to be appropriate as a whole, leading to erroneous determination. When the fixed window glass including the portions in which the application amount of the adhesive is excessive is bonded and fixed to a vehicle body, there is a risk in that the excessive adhesive sticks out to an inner side of the vehicle to have adverse effects on the beauty of the vehicle. Therefore, it is required to perform removal operation of the adhesive that sticks out to the inner side of the vehicle and to perform replacement operation of the fixed window glass in some cases, resulting in great economic loss.

Thus, it is desired to establish a technology capable of accurately inspecting the application state of the adhesive applied onto the fixed window glass before the fixed window glass is bonded and fixed to the vehicle body.

In the current circumstances, there is a demand for the above-mentioned technology in various workpieces to be bonded and fixed as well as the fixed window glass.

The present invention has an object to accurately inspect an application state of an adhesive with respect to a workpiece before the workpiece is bonded and fixed.

Solution to Problem

The present invention has been devised to achieve the above-mentioned object, and therefore provides an adhesive inspection device, which is configured to inspect an application state of an adhesive that is linearly applied onto a workpiece, the adhesive inspection device comprising: a laser irradiation unit configured to irradiate the adhesive with line laser light from above the adhesive so that a projection line extends over a surface of the adhesive to portions of the workpiece on both sides of the adhesive; an imaging unit configured to image, from above the adhesive, an imaging region that includes the projection line and is located on a periphery of the adhesive, and output imaging information; and a determination unit configured to determine, based on the imaging information, a shape surrounded by the projection line formed on the surface of the adhesive and a surface of the workpiece.

In this case, the shape surrounded by the projection line formed on the surface of the adhesive and the surface of the workpiece is substantially the same as the cross-sectional shape of the adhesive. Therefore, with the above-mentioned configuration, the application state of the adhesive with respect to the workpiece can be determined based on the cross-sectional shape (or a shape close thereto) of the adhesive. That is, the application state can be more directly determined based on the shape of the adhesive instead of being indirectly determined based on the application amount of the adhesive, and the like. Thus, the application state of the adhesive with respect to the workpiece can be accurately inspected before the workpiece is actually bonded and fixed.

In the above-mentioned configuration, it is preferred that the determination unit determine the shape by calculating two or more of a height, a width, and a cross-sectional area of the shape based on the imaging information. With this, the cross-sectional shape of the adhesive can be more accurately determined, and the application state of the adhesive can be determined with higher accuracy.

In this case, it is preferred that the determination unit determine the shape by calculating the height, the width, and the cross-sectional area of the shape based on the imaging information. That is, in the cross-sectional shape of the adhesive, even when the height and the width are appropriate, there are cases in which the amount of the adhesive is large with the side surface of the adhesive being swollen and in which the amount of the adhesive is small with the side surface of the adhesive being dented. Thus, when the cross-sectional area of the shape is calculated in addition to the height and the width of the shape, the application state of the adhesive can be correctly determined to be inappropriate when such a situation occurs.

In the above-mentioned configuration, the determination unit may calculate the cross-sectional area of the shape and further calculate a weight of the adhesive applied onto the workpiece based on the calculated cross-sectional area. That is, there is a case in which an application weight of the adhesive per unit length is determined as a design criterion. Thus, when the weight of the adhesive is calculated as in the above-mentioned configuration in such a case, it can be confirmed whether or not the adhesive has been applied in accordance with the design criterion.

In the above-mentioned configuration, it is preferred that the adhesive inspection device further comprise a baffle member information storage unit in which baffle member information indicating a shape of a baffle member other than the adhesive on the workpiece included in the imaging region is stored in advance together with positional information on the workpiece, and that the determination unit determine the shape based on information obtained by subtracting the baffle member information corresponding to the positional information from the imaging information. With this, the effect of the baffle member serving as an obstacle to determination of the shape of the adhesive can be reduced, and hence it can be prevented to erroneously determine the baffle member as a part of the adhesive.

In the above-mentioned configuration, it is preferred that the adhesive inspection device further comprise an application pattern information storage unit in which application pattern information indicating a number of application lines of the adhesive on the workpiece is stored in advance together with positional information on the workpiece, and that the determination unit determine the shape based on the imaging information and the application pattern information. That is, the adhesive is linearly applied onto the workpiece. There area portion in which the adhesive is applied as one line and a portion in which the adhesive is applied as a plurality of (for example, two) parallel lines. Thus, when the cross-sectional shape of the adhesive is determined in consideration of the application pattern information indicating the number of application lines of the adhesive as in the above-mentioned configuration, the application state can be inspected with satisfactory accuracy even when various application patterns of the adhesive are formed.

In the above-mentioned configuration, the laser irradiation unit may vertically irradiate the adhesive with the line laser light from above the adhesive, and the imaging unit may image the imaging region from above any one of a front diagonal portion and a back diagonal portion of the adhesive with a vertical irradiation surface of the line laser light being a boundary.

The present invention has been devised to achieve the above-mentioned object, and therefore also provides an adhesive inspection method of inspecting an application state of an adhesive that is linearly applied onto a workpiece, the adhesive inspection method comprising the steps of: irradiating the adhesive with line laser light from above the adhesive through use of a laser irradiation unit so that a projection line extends over a surface of the adhesive to portions of the workpiece on both sides of the adhesive; imaging, from above the adhesive, an imaging region that includes the projection line and is located on a periphery of the adhesive to create imaging information through use of an imaging unit; and determining, based on the imaging information, a shape surrounded by the projection line formed on the surface of the adhesive and a surface of the workpiece. With the above-mentioned configuration, the same effects as those of the corresponding configuration described above can be exhibited.

In the above-mentioned configuration, it is preferred that the workpiece be fixed window glass for an automobile.

Advantageous Effects of Invention

According to the present invention, the application state of the adhesive with respect to the workpiece can be accurately inspected before the workpiece is bonded and fixed.

DESCRIPTION OF EMBODIMENTS

Now, one embodiment of the present invention is described with reference to the accompanying drawings.

Figure 1:
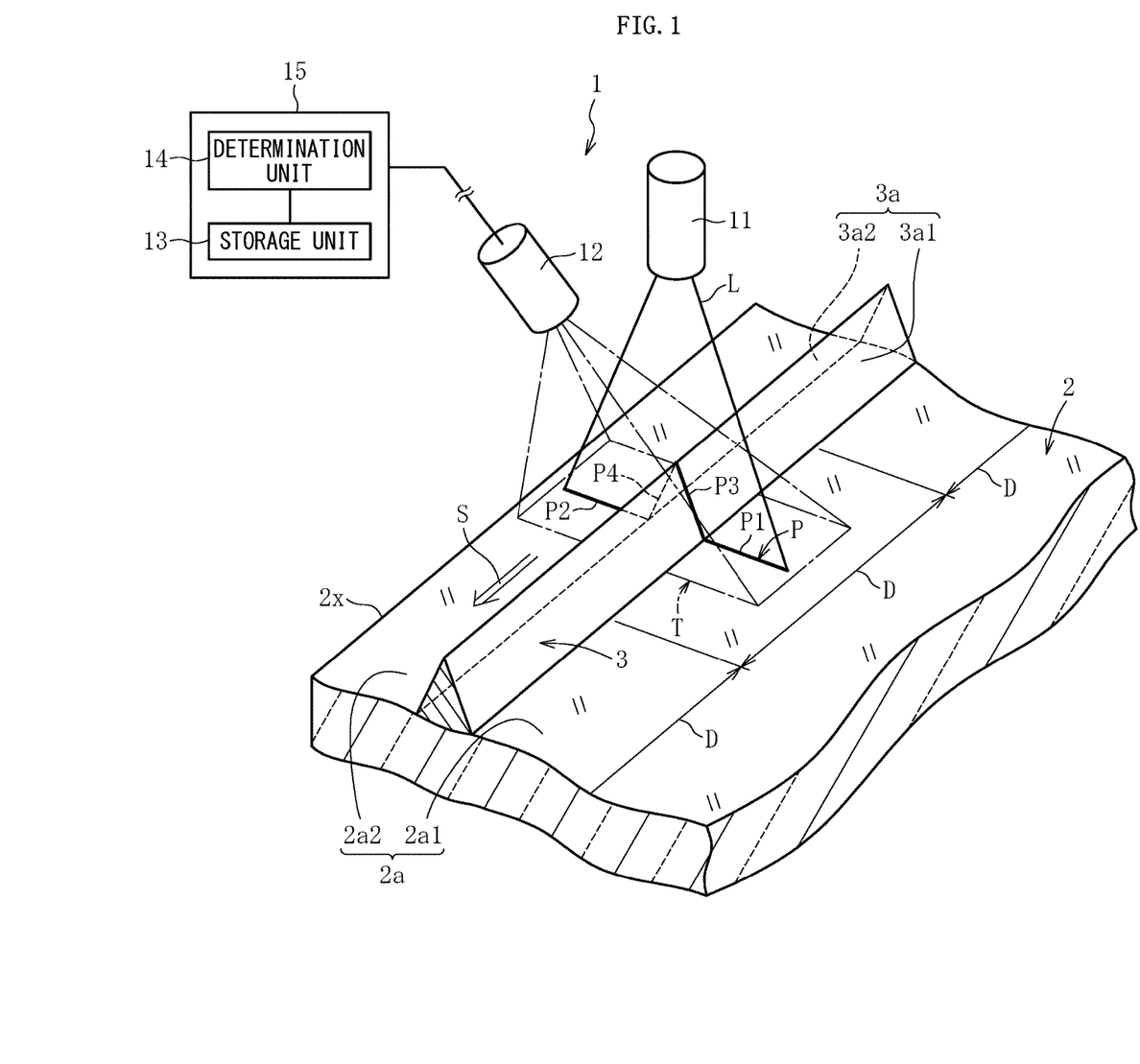
FIG. 1 is a perspective view for illustrating an adhesive inspection device according to an embodiment of the present invention.

As illustrated in FIG. 1, an adhesive inspection device 1 is configured to inspect an application state of an adhesive 3 that is linearly applied in a predetermined cross-sectional shape onto fixed window glass (hereinafter sometimes simply referred as "glass") 2 for an automobile, which serves as a workpiece, along a peripheral edge portion 2x. In this embodiment, the adhesive 3 is applied in a frame shape along the peripheral edge portion 2x of the glass 2, and an application region of the adhesive 3 forms a substantially closed curve. Further, the cross-sectional shape of the adhesive 3 is a substantially triangular shape. Further, as the adhesive 3, urethane or other opaque adhesive (for example, a black adhesive) is used.

The adhesive inspection device 1 comprises a laser irradiation unit 11, an imaging unit 12, a storage unit 13, and a determination unit 14. In this embodiment, the storage unit 13 and the determination unit 14 are formed by a personal computer (PC) 15 connected to the imaging unit 12 through a wire or wirelessly. The PC 15 also encompasses a tablet terminal.

The laser irradiation unit 11 is configured to irradiate the adhesive 3 with line laser light L from above the adhesive 3 so that a projection line P extends over a surface 3a of the adhesive 3 to a surface 2a of a glass 2 on right and left sides of the adhesive 3. The projection line P formed in a portion irradiated with the line laser light L comprises a first portion P1 formed on a surface 2a1 of the glass 2 on one side of the adhesive 3, a second portion P2 formed on a surface 2a2 of the glass 2 on the other side of the adhesive 3, a third portion P3 formed on one inclined surface 3a1 of the adhesive 3, and a fourth portion P4 formed on the other inclined surface 3a2 of the adhesive 3. Each of the portions P1 to P4 is caused by the line laser light L, and hence the adjacent portions are continuously formed.

As the laser irradiation unit 11, for example, an infrared laser can be used.

The imaging unit 12 is configured to image, from above the adhesive 3, an imaging region T (rectangular region in the illustrated example) that includes the projection line P and is located on the periphery of the adhesive 3, and output imaging information. In this embodiment, the imaging information is output for each of predetermined sections D in a longitudinal direction (or a scanning direction S) of the adhesive 3. That is, the adhesive inspection device 1 is configured to inspect the application state of the adhesive 3 for each of the predetermined sections D. Therefore, in one section D, the application state of the adhesive 3 is inspected on the assumption that the shape of the adhesive 3 is the same. When the length of the section D is decreased, precise inspection can be realized. When the length of the section D is increased, high-speed inspection can be realized. The length of the section D is preferably 20 mm or less, more preferably 15 mm or less, still more preferably 10 mm or less. In this case, the inspection interval of the adhesive 3 becomes dense, and hence a defect, for example, disconnection of the adhesive 3 in the longitudinal direction can also be detected. In a region in which the adhesive 3 is applied in a curved shape, for example, an arc shape in plan view, it is preferred that the length of one section D be set to be smaller than that of a region in which the adhesive 3 is linearly applied in plan view.

As the imaging unit 12, for example, a CCD camera can be used.

The laser irradiation unit 11 and the imaging unit 12 integrally move through a space above the glass 2 in the scanning direction S along the longitudinal direction of the adhesive 3. With this, the line laser light L is successively scanned along the longitudinal direction of the adhesive 3. The glass 2 side may be moved under a state in which the laser irradiation unit 11 and the imaging unit 12 are immobilized. That is, it is only required that a unit including the laser irradiation unit 11 and the imaging unit 12, and the glass 2 move relative to each other.

Figure 2A:
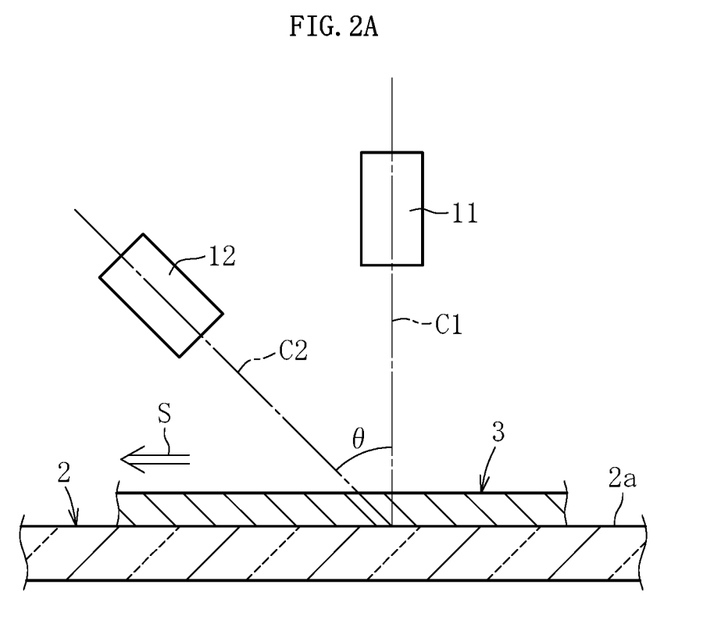
FIG. 2A is a vertical sectional view for illustrating a positional relationship between a laser irradiation unit and an imaging unit of FIG. 1.
Figure 2B:
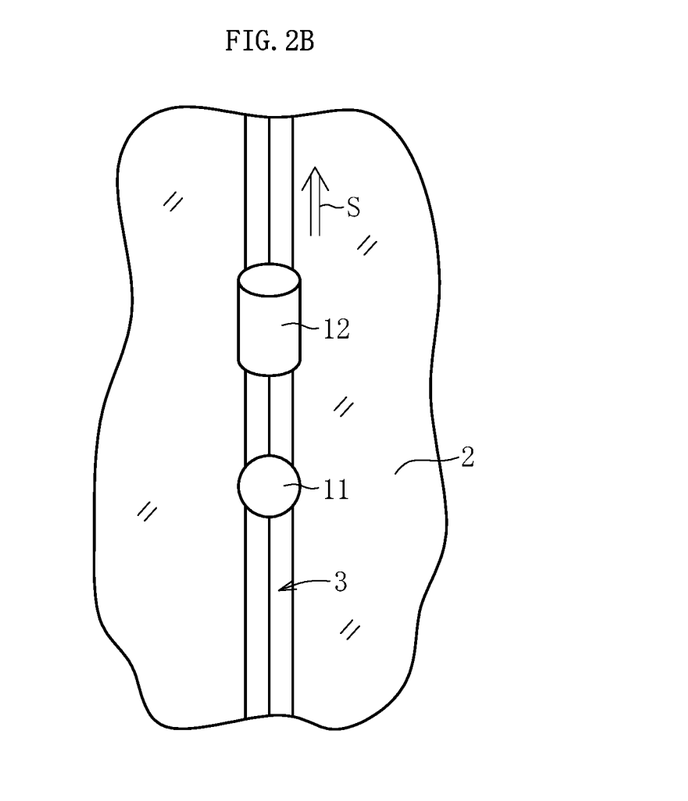
FIG. 2B is a plan view for illustrating the positional relationship between the laser irradiation unit and the imaging unit of FIG. 1.

As illustrated in FIG. 2A and FIG. 2B, the laser irradiation unit 11 and the imaging unit 12 are arranged directly above the adhesive 3. In this embodiment, when the adhesive 3 has a linear shape parallel to the scanning direction S, each of the laser irradiation unit 11 and the imaging unit 12 is arranged on an imaginary vertical plane passing through an apex (ridge line) of the adhesive 3 having a triangular cross-sectional shape. A center line C1 of the laser irradiation unit 11 is perpendicular to the surface 2a of the glass 2, and the laser irradiation unit 11 is configured to vertically irradiate the adhesive 3 with the line laser light L. Meanwhile, a center line C2 of the imaging unit 12 is inclined with respect to the center line C1 of the laser irradiation unit 11. The center line C1 of the laser irradiation unit 11 and the center line C2 of the imaging unit 12 are set so as to cross each other on the surface 2a of the glass 2 (cross each other on a leg of a perpendicular extending from the apex of the adhesive 3 to the surface 2a of the glass 2 in the illustrated example). An angle θ formed by the center line C1 and the center line C2 is, for example, preferably from 30° to 60°, and is 45° in this embodiment. There is no particular limitation on the arrangement positions of the laser irradiation unit 11 and the imaging unit 12. The arrangement positions can be suitably adjusted as long as the projection line P extends to both sides of the adhesive 3 and the projection line P can be imaged. For example, in this embodiment, the imaging unit 12 is arranged on a front side of the laser irradiation unit 11 in the scanning direction S, but may be arranged on a back side thereof in the scanning direction S. Further, the above-mentioned positions of the laser irradiation unit 11 and the imaging unit 12 may be replaced by one another.

In the storage unit 13 illustrated in FIG. 1, reference shape information indicating a reference shape obtained when the adhesive 3 is appropriately applied is stored (reference shape storage unit). The reference shape may be the same in the entire application region of the adhesive 3, but varies for each predetermined region in this embodiment. That is, the reference shape information is stored as data linked to positional information (for example, coordinate data with respect to an inspection stage, etc.) of a region onto which the adhesive 3 is applied. In this embodiment, three parameters including a cross-sectional area, a height, and a width of the reference shape of the adhesive 3 are stored in advance. Of those three parameters, only any two parameters may be stored. In this embodiment, a model (master) having the reference shape of the adhesive is actually measured in advance, to thereby create and store the reference shape information. The reference shape information may be directly input as data to be stored without actual measurement.

Further, in the storage unit 13, baffle member shape information indicating the shape of a baffle member formed on the surface 2a of the glass 2 included in the imaging region T is stored in advance under a state of being linked to the positional information (baffle member shape storage unit). Examples of the baffle member include a packing configured to prevent the adhesive 3 from entering an inner side of a vehicle (see FIG. 5A) and a fastener configured to fix the glass 2 to the vehicle body (see FIG. 6A). The position and size of the baffle member on the surface 2a of the glass 2 are determined in advance. In this embodiment, the model (master) having the shape of the baffle member is actually measured in advance, to thereby create and store the baffle member shape information. The baffle member shape information may be directly input as data to be stored without actual measurement.

Further, in the storage unit 13, application pattern information indicating the number of application lines of the adhesive 3 to be applied onto the surface 2a of the glass 2 is stored in advance under a state of being linked to the positional information (application pattern storage unit). In this embodiment, an application pattern comprises a portion of one line of the adhesive 3 and a portion of two parallel lines of the adhesive (see FIG. 7A), and each position of the portion of one line and the portion of two lines is determined in advance. Examples of the portion of two lines of the adhesive 3 include a portion in which a leading end portion that is an application start position of the adhesive 3 overlaps with a trailing end portion that is an application finish position of the adhesive 3.

As the storage unit 13, for example, a memory of the PC 15 can be used.

Figure 3:
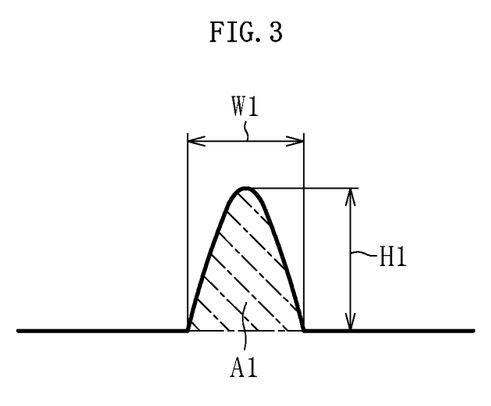
FIG. 3 is a view for illustrating one example of imaging information output from the imaging unit of FIG. 1.
Figure 4A:
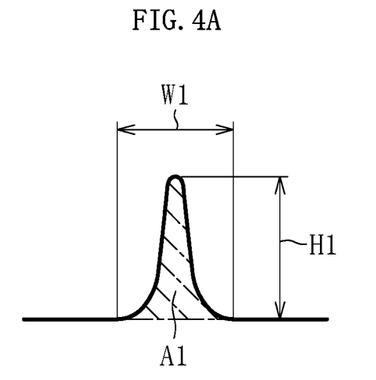
FIG. 4A is a view for illustrating one example of imaging information when an application state of an adhesive is inappropriate.
Figure 4B:
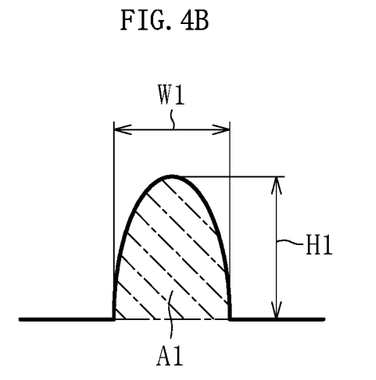
FIG. 4B is a view for illustrating one example of imaging information when the application state of the adhesive is inappropriate.

When imaging information as illustrated in FIG. 3 is obtained, the determination unit 14 determines a shape A1 surrounded by the projection line P (third portion P3 and fourth portion P4) formed on the surface of the adhesive 3 and the surface 2*a* of the glass 2 based on the imaging information. The shape A1 reflects the cross-sectional shape of the adhesive 3. In this embodiment, the shape A1 is determined based on a height H1, a width W1, and a cross-sectional area (hatched portion) of the shape A1. Specifically, the determination unit 14 reads the reference shape information from the storage unit 13 while calculating the height H1, the width W1, and the cross-sectional area of the shape A1, and compares the calculated height H1, width W1, and cross-sectional area of the shape A1 to the height, width, and cross-sectional area of the reference shape information, respectively. As a result, when a difference therebetween falls within a predetermined threshold value, it is determined that the application state of the adhesive 3 is appropriate. Meanwhile, when the difference therebetween is more than the predetermined threshold value, it is determined that the application state of the adhesive 3 is inappropriate. With this, even when the amount of the adhesive is small with the inclined surface of the adhesive 3 being dented (FIG. 4A) or even when the amount of the adhesive 3 is large with the inclined surface of the adhesive 3 being swollen (FIG. 4B), in spite of the fact that the height H1 and the width W1 fall within an appropriate range as compared to the reference shape, it can be correctly determined that the application state of the adhesive 3 is inappropriate based on the calculated cross-sectional area. In this case, the cross-sectional area is determined based on an integral value of the imaging information corresponding to the calculated width of the shape.

Figure 5A:
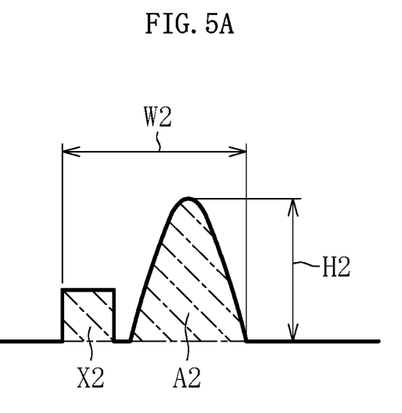
FIG. 5A is a view for illustrating one example of a state before the imaging information output from the imaging unit of FIG. 1 is corrected.
Figure 5B:
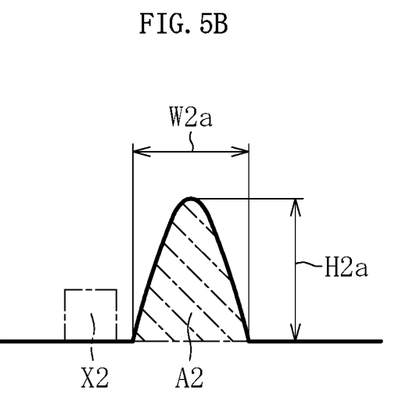
FIG. 5B is a view for illustrating one example of a state after the imaging information illustrated in FIG. 5A is corrected.

Further, at a position where the packing is formed in the vicinity of the adhesive 3 on the surface 2*a* of the glass 2, imaging information as illustrated in FIG. 5A may be obtained. That is, a shape X2 of the packing is reflected on the imaging information besides a shape A2 of the adhesive 3. In this state, the determination unit 14 calculates a height H2, a width W2, and a cross-sectional area including those of the shape X2 of the packing, leading to erroneous determination of the application state of the adhesive. In view of the foregoing, in this embodiment, when the adhesive inspection device 1 reaches a position at which the packing is included in the imaging information, the determination unit 14 reads the positional information and the baffle member shape information stored in advance in the storage unit 13, and subtracts the baffle member shape information (shape information on the packing) corresponding to the position from the imaging information. With this, as illustrated in FIG. 5B, imaging information in which the shape X2 of the packing is deleted or reduced in size is obtained. A height H2*a*, a width W2*a*, and a cross-sectional area of the shape A2 of the adhesive 3 are calculated based on the corrected imaging information to determine the application state.

Figure 6A:
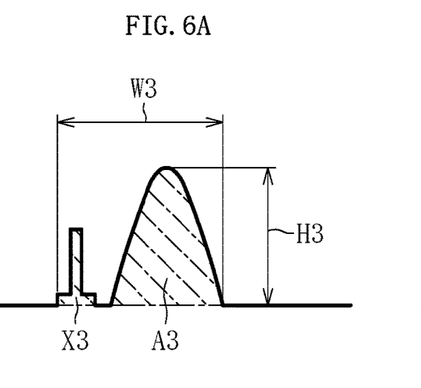
FIG. 6A is a view for illustrating one example of a state before the imaging information output from the imaging unit of FIG. 1 is corrected.
Figure 6B:
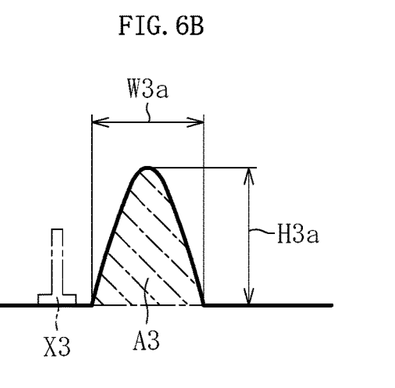
FIG. 6B is a view for illustrating one example of a state after the imaging information illustrated in FIG. 6A is corrected.

Further, at a position where the fastener is formed in the vicinity of the adhesive 3 on the surface 2*a* of the glass 2, imaging information as illustrated in FIG. 6A may be obtained. That is, as in the case of the packing, a shape X3 of the fastener is reflected on the imaging information besides a shape A3 of the adhesive 3. In this state, the determination unit 14 calculates a height H3, a width W3, and a cross-sectional area including those of the shape X3 of the fastener. In view of the foregoing, in this embodiment, when the adhesive inspection device 1 reaches a position at which the fastener is included in the imaging information, the determination unit 14 reads the positional information and the baffle member shape information stored in advance in the storage unit 13, and subtracts the baffle member shape information (shape information on the fastener) corresponding to the position from the imaging information. With this, as illustrated in FIG. 6B, imaging information in which the shape X3 of the fastener is deleted or reduced in size is obtained. A height H3*a*, a width W3*a*, and a cross-sectional area of the shape A3 of the adhesive 3 are calculated based on the corrected imaging information to determine the application state.

Figure 7A:
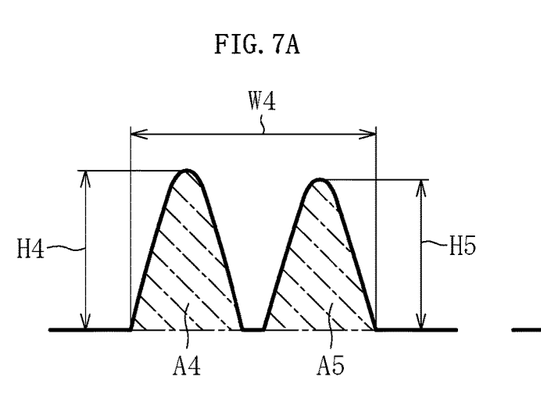
FIG. 7A is a view for illustrating one example a state before the imaging information output from the imaging unit of FIG. 1 is corrected.
Figure 7B:
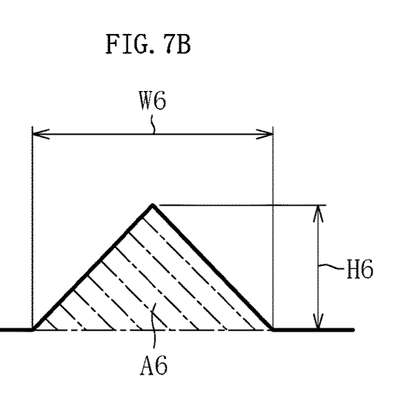
FIG. 7B is a view for illustrating one example of a state after the imaging information illustrated in FIG. 7A is corrected.

Further, imaging information as illustrated in FIG. 7A may be obtained at a position where the adhesive 3 is arranged in two parallel lines on the surface 2*a* of the glass 2. It is known from the application pattern information that the shape of two lines of the adhesive 3 is included in the imaging information in this state. Therefore, the application state of the adhesive 3 may be determined by calculating a height, a width, and a cross-sectional area of each of shapes A4 and A5, but in this embodiment, the application state of the adhesive 3 is determined as described below. That is, the shapes A4 and A5 are replaced by one triangular cross-sectional shape equivalent to the shapes A4 and A5. Specifically, as illustrated in FIG. 7B, one triangular shape A6 having a height H6 with the same value as a larger one of the heights of the shapes A4 and A5 (H4 in the illustrated example) and having a cross-sectional area with the same value as a total cross-sectional area of the shapes A4 and A5 is obtained. Then, a width W6 of the one triangular shape A6 thus replaced is calculated. In this case, when the total cross-sectional area of the shapes A4 and A5 is assumed to be S6, an equation: $W6=2 \times S6/H6$ holds. The application state is determined based on the height H6, the width W6, and the cross-sectional area S6.

Here, in this embodiment, when the application state of the adhesive is determined, the cross-sectional area of the cross-sectional shape of the adhesive 3 is calculated. Therefore, the determination unit 14 multiplies the calculated cross-sectional area by the application length of the adhesive 3 determined in advance and the specific gravity of the adhesive 3 to calculate a weight of the adhesive 3 applied onto the surface 2*a* of the glass 2, and outputs the calculated weight together with the above-mentioned inspection results of the application state. With this, the weight (application amount) of the adhesive 3 per unit length and the total weight of the adhesive 3 applied onto the surface 2*a* of the glass 2 can be confirmed. The calculation of the weight of the adhesive 3 may be omitted.

As the determination unit 14, for example, a CPU of the PC 15 can be used.

Next, an adhesive inspection method using the adhesive inspection device configured as described above is described.

Figure 8:
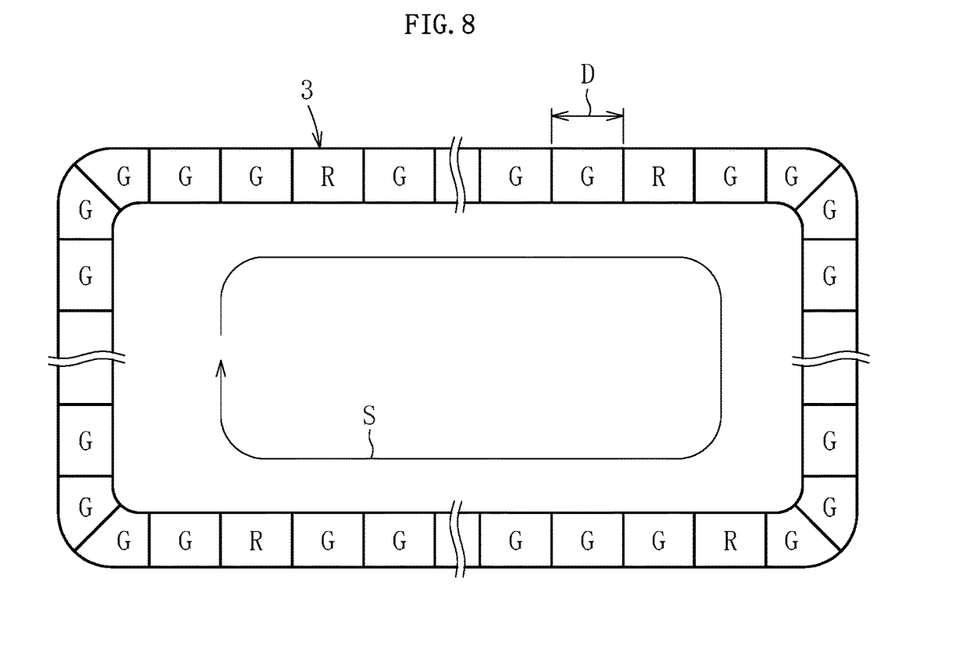
FIG. 8 is a view for illustrating one example of a display form of inspection results of the adhesive inspection device of FIG. 1.

First, as illustrated in FIG. 1, the fixed window glass 2 for an automobile having the adhesive 3 applied onto the surface 2*a* by an application device (not shown) is set on an inspection stage (not shown) of the adhesive inspection device 1 in a horizontal posture in which the surface 2*a* is directed upward. In this state, the adhesive 3 is irradiated with the line laser light L from above the adhesive 3 by the laser irradiation unit 11 so that the projection line P extends over the surface 3a of the adhesive 3 to portions of the surface 2a of the glass 2 on both sides of the adhesive 3 (irradiation step). Next, the imaging region T that includes the projection line P and is located on the periphery of the adhesive 3 is imaged from above the adhesive 3 by the imaging unit 12 to create imaging information (imaging step). After that, the shape surrounded by the projection line P formed on the surface 3a of the adhesive 3 and the surface 2a of the glass 2 is determined based on the height, the width, and the cross-sectional area of the shape with reference to the imaging information, and it is determined whether or not the application state of the adhesive 3 is appropriate based on the results (determining step). In the determining step, it is determined that the application state of the adhesive 3 is appropriate when all the height, width, and cross-sectional area of the shape fall within a range of respective predetermined values (including the case in which the predetermined values vary for each predetermined section), and it is determined that the application state of the adhesive 3 is inappropriate when one or more of the height, the width, and the cross-sectional area of the shape are out of the range of the predetermined values. The determining step is performed for each of the predetermined sections D along the longitudinal direction of the adhesive 3. When the inspection is finished on the entire periphery of the adhesive 3 while determination is made for each of the predetermined sections D, an inspection result for each of the predetermined sections D is displayed on the information displaying the application area of the adhesive 3 as illustrated in FIG. 8 in this embodiment. With this, the inspection results and positions can be easily grasped in a visual manner. In the illustrated example, a portion denoted by "G" has a green color that means that the application state is appropriate, and a portion denoted by "R" has a red color that means that the application state is inappropriate. The display form of the inspection results is not limited to the foregoing, and the positional information and the inspection results for each of the predetermined sections may be displayed as a list.

The adhesive inspection device and inspection method according to the embodiment of the present invention are described above. However, the embodiment of the present invention is not limited thereto and can be variously modified within the range not departing from the spirit of the present invention.

In the above-mentioned embodiment, description is made of the case in which the cross-sectional shape of the adhesive 3 is a triangular shape, but the cross-sectional shape may be another shape, for example, a rectangular shape or a semicircular shape.

Further, in the above-mentioned embodiment, description is made of the case in which the adhesive inspection device 1 is provided separately from the application device of the adhesive 3, but the adhesive inspection device 1 may be incorporated in the application device. In this case, the application state of the adhesive 3 may be successively inspected while the adhesive 3 is applied onto the surface 2a of the glass 2. With this, at substantially the same time as the application of the adhesive 3 is finished, the inspection of the application state of the adhesive 3 is also finished.

Further, in the above-mentioned embodiment, description is made of the case in which the application state of the adhesive is determined based on the height, the width, and the cross-sectional area of the cross-sectional shape of the adhesive. However, the application state of the adhesive may be determined based on two of the height, the width, and the cross-sectional area of the cross-sectional shape of the adhesive. That is, the application state of the adhesive may be determined based on the height and width of the cross-sectional shape of the adhesive, the height and cross-sectional shape thereof, or the width and cross-sectional shape thereof.

Further, in the above-mentioned embodiment, artificial intelligence (AI) may be caused to learn a pattern of the imaging information so that AI can determine whether or not the cross-sectional shape of the adhesive is appropriate. In this case, the determination accuracy is improved by causing AI to learn a large amount of baffle member shape information and application pattern information.

Further, in the above-mentioned embodiment, the case in which the workpiece is fixed window glass for an automobile is described as an example, but the workpiece may be a liquid crystal panel of a liquid crystal display, for example.

REFERENCE SIGNS LIST

1 adhesive inspection device
11 laser irradiation unit
12 imaging unit
13 storage unit
14 determination unit
15 personal computer
2 fixed window glass (workpiece)
3 adhesive
L line laser light
P projection line
S scanning direction
T imaging region

The invention claimed is:

1. An adhesive inspection device, which is configured to inspect an application state of an adhesive that is linearly applied onto a workpiece,
   the adhesive inspection device comprising:
      a laser irradiation unit configured to irradiate the adhesive with line laser light from above the adhesive so that a projection line extends over a surface of the adhesive to portions of the workpiece on both sides of the adhesive;
      an imaging unit configured to image, from above the adhesive, an imaging region that includes the projection line and is located on a periphery of the adhesive, and output imaging information;
      a baffle member shape storage unit, in which baffle member shape information indicating a shape of a baffle member other than the adhesive on the workpiece included in the imaging region is stored in advance together with positional information on the workpiece; and
      a determination unit configured to determine, based on the imaging information, a shape surrounded by the projection line formed on the surface of the adhesive and a surface of the workpiece,
   wherein the determination unit is configured to determine the shape based on information obtained by subtracting the baffle member shape information corresponding to the positional information from the imaging information.

2. An adhesive inspection device, which is configured to inspect an application state of an adhesive that is linearly applied onto a workpiece,
   the adhesive inspection device comprising:
      a laser irradiation unit configured to irradiate the adhesive with line laser light from above the adhesive so that a projection line extends over a surface of the adhesive to portions of the workpiece on both sides of the adhesive;

an imaging unit configured to image, from above the adhesive, an imaging region that includes the projection line and is located on a periphery of the adhesive, and output imaging information;

an application pattern storage unit, in which application pattern information indicating a number of application lines of the adhesive on the workpiece is stored in advance together with positional information on the workpiece; and a determination unit configured to determine, based on the imaging information, a shape surrounded by the projection line formed on the surface of the adhesive and a surface of the workpiece, wherein the determination unit is configured to determine the shape based on the imaging information and the application pattern information.

3. An adhesive inspection method of inspecting an application state of an adhesive that is linearly applied in a predetermined cross-sectional shape onto a workpiece, the adhesive inspection method comprising the steps of:

irradiating the adhesive with line laser light from above the adhesive through use of a laser irradiation unit so that a projection line extends over a surface of the adhesive to portions of the workpiece on both sides of the adhesive;

imaging, from above the adhesive, an imaging region that includes the projection line and is located on a periphery of the adhesive to create imaging information through use of an imaging unit; and determining a shape surrounded by the projection line formed on the surface of the adhesive and a surface of the workpiece based on information obtained by subtracting baffle member shape information corresponding to positional information on the workpiece from the imaging information, wherein the baffle member shape information indicates a shape of a baffle member other than the adhesive on the workpiece included in the imaging region and is stored in advance together with the positional information on the workpiece in a baffle member shape storage unit.

4. The adhesive inspection method according to claim 3, wherein the workpiece comprises fixed window glass for an automobile.

5. An adhesive inspection method of inspecting an application state of an adhesive that is linearly applied in a predetermined cross-sectional shape onto a workpiece, the adhesive inspection method comprising the steps of:

irradiating the adhesive with line laser light from above the adhesive through use of a laser irradiation unit so that a projection line extends over a surface of the adhesive to portions of the workpiece on both sides of the adhesive;

imaging, from above the adhesive, an imaging region that includes the projection line and is located on a periphery of the adhesive to create imaging information through use of an imaging unit; and determining, based on the imaging information and application pattern information, a shape surrounded by the projection line formed on the surface of the adhesive and a surface of the workpiece, wherein the application pattern information indicates a number of application lines of the adhesive on the workpiece and is stored in advance together with positional information on the workpiece in an application pattern storage unit.

6. The adhesive inspection method according to claim 5, wherein the workpiece comprises fixed window glass for an automobile.

7. The adhesive inspection device according to claim 1, wherein the determination unit is configured to determine the shape by calculating two or more of a height, a width, and a cross-sectional area of the shape based on the imaging information.

8. The adhesive inspection device according to claim 7, wherein the determination unit is configured to determine the shape by calculating the height, the width, and the cross-sectional area of the shape based on the imaging information.

9. The adhesive inspection device according to claim 1, wherein the determination unit is configured to calculate a cross-sectional area of the shape, and further calculate a weight of the adhesive applied onto the workpiece based on the calculated cross-sectional area.

10. The adhesive inspection device according to claim 1, wherein the laser irradiation unit is configured to vertically irradiate the adhesive with the line laser light from above the adhesive, and wherein the imaging unit is configured to image the imaging region from above any one of a front diagonal portion and a back diagonal portion of the adhesive with a vertical irradiation surface of the line laser light being a boundary.

11. The adhesive inspection device according to claim 2, wherein the determination unit is configured to determine the shape by calculating two or more of a height, a width, and a cross-sectional area of the shape based on the imaging information.

12. The adhesive inspection device according to claim 11, wherein the determination unit is configured to determine the shape by calculating the height, the width, and the cross-sectional area of the shape based on the imaging information.

13. The adhesive inspection device according to claim 2, wherein the determination unit is configured to calculate a cross-sectional area of the shape, and further calculate a weight of the adhesive applied onto the workpiece based on the calculated cross-sectional area.

14. The adhesive inspection device according to claim 2, wherein the laser irradiation unit is configured to vertically irradiate the adhesive with the line laser light from above the adhesive, and wherein the imaging unit is configured to image the imaging region from above any one of a front diagonal portion and a back diagonal portion of the adhesive with a vertical irradiation surface of the line laser light being a boundary.

* * * * *